(12) United States Patent
Burlingame

(10) Patent No.: US 6,305,891 B1
(45) Date of Patent: Oct. 23, 2001

(54) FASTENING DEVICE AND A SPACER, AND A METHOD OF USING THE SAME

(76) Inventor: Mark S. Burlingame, 23030 SW. Schmeltzer Rd., Sherwood, OR (US) 97140

(*) Notice: Subject to any disclaimer, the term of this patent is extended or adjusted under 35 U.S.C. 154(b) by 0 days.

(21) Appl. No.: 09/571,005

(22) Filed: May 15, 2000

(51) Int. Cl.[7] .............................. F16B 15/00; F16B 15/02
(52) U.S. Cl. ......................... 411/469; 411/443; 411/475; 411/480; 411/920
(58) Field of Search ................................. 411/469, 474, 411/475, 480, 920, 442, 443

(56) References Cited

U.S. PATENT DOCUMENTS

| | | | |
|---|---|---|---|
| 2,003,062 | * | 5/1935 | Wickwire .............................. 411/469 |
| 3,894,174 | * | 7/1975 | Cartun ................................. 411/920 X |
| 4,278,091 | * | 7/1981 | Borzone ............................... 411/469 X |
| 4,573,469 | * | 3/1986 | Golden et al. ........................ 411/469 X |
| 4,801,064 | * | 1/1989 | Mangone, Jr. ........................ 411/469 X |

* cited by examiner

Primary Examiner—Neill Wilson
(74) Attorney, Agent, or Firm—Ingrid McTaggart

(57) ABSTRACT

A fastening device comprises a "U" shaped spacer wherein the recess of the "U" shape is captured by the upper cross bar of a staple when the staple is used to fasten a protective sheeting to an item to be stored or transported. The spacer has a flat bottom surface and a flat side surface. The flat bottom surface increases the surface area of the staple in contact with the item during transport thereby reducing the chances that the protective sheeting may become torn from the item. The flat side surface increases the surface area of the standard staple during removal of the plastic sheeting because the spacer rotates about the crossbar of the staple. This rotation of the spacer reduces frictional contact between the spacer and the protective sheeting so that when the plastic sheeting is pulled from the lumber, the plastic sheeting will pull the spacer and the staple therefrom. In a preferred embodiment, the staples and the spacers are fed along flat, parallel elongate axes underneath the handle of a staple gun to allow one-handed fastening of the staples and the spacers to a lumber unit.

15 Claims, 5 Drawing Sheets

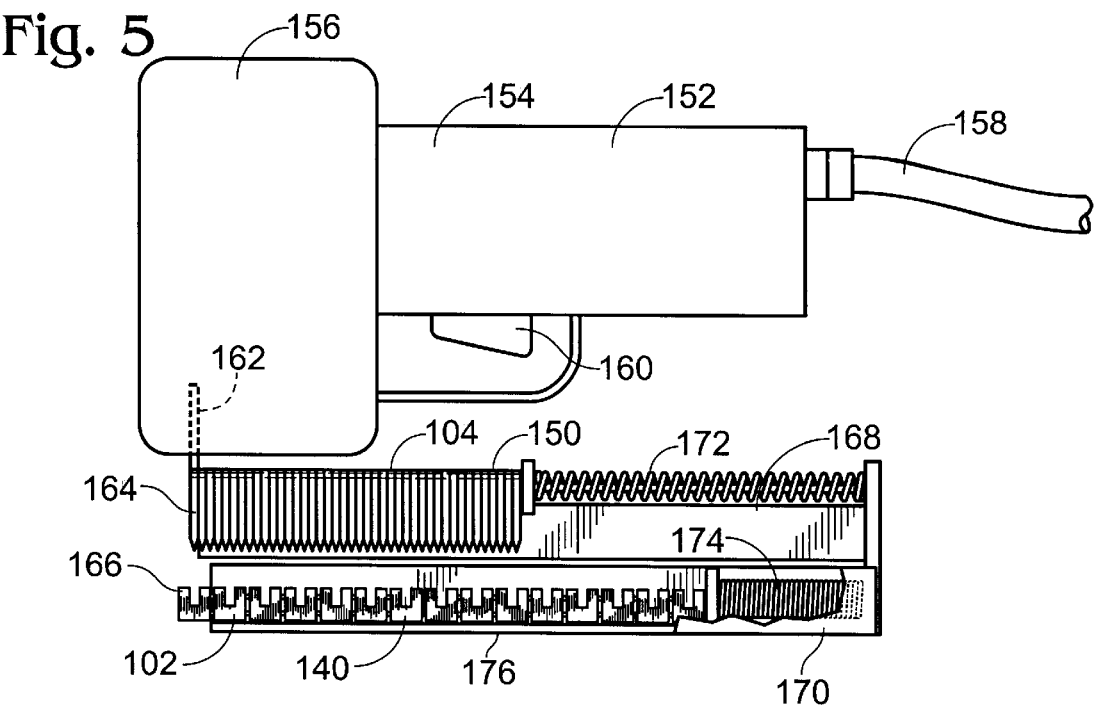
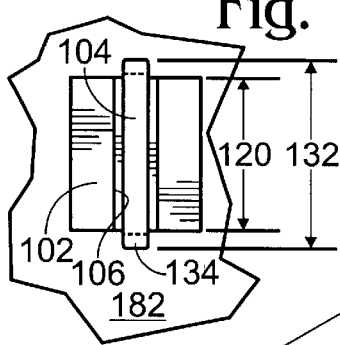
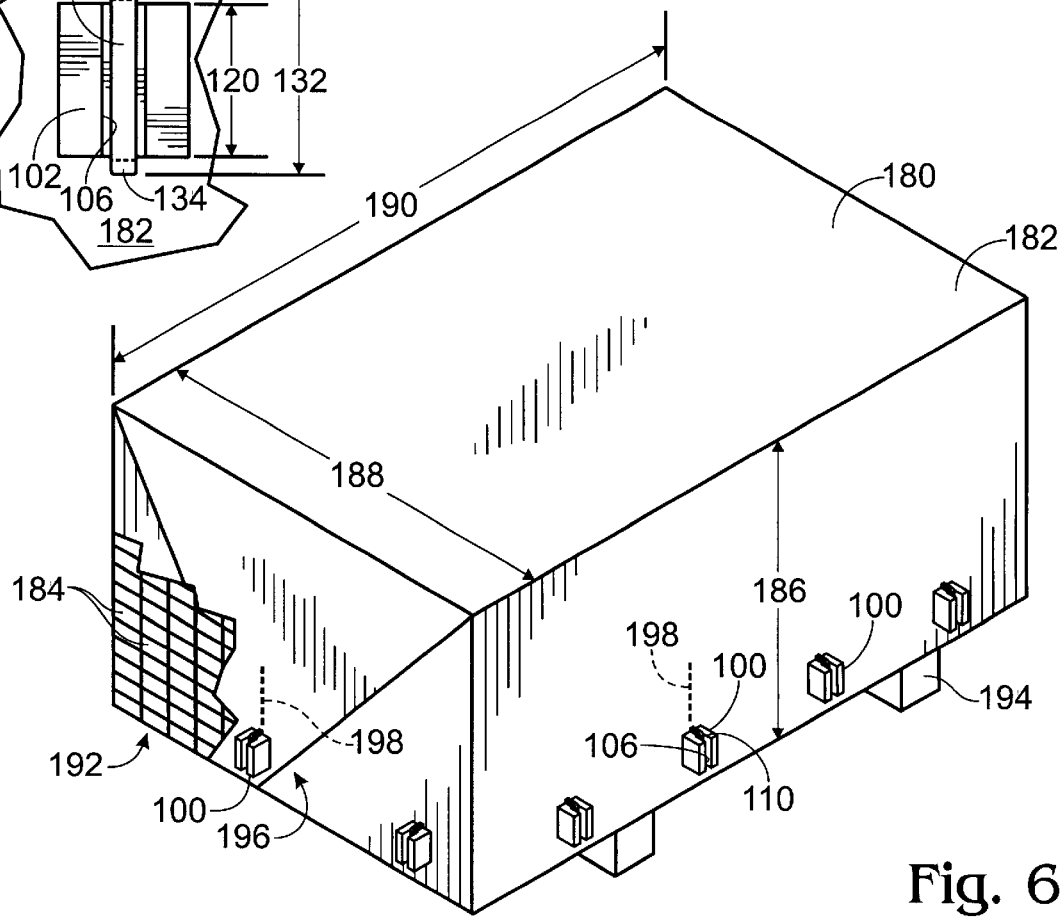

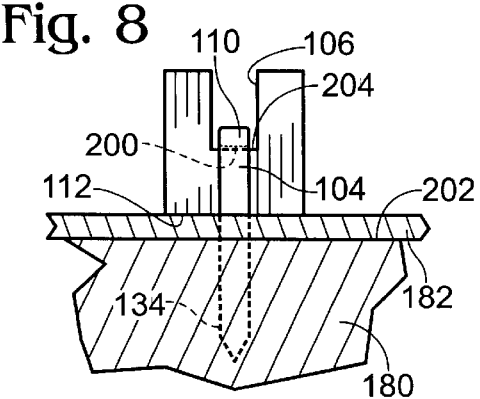
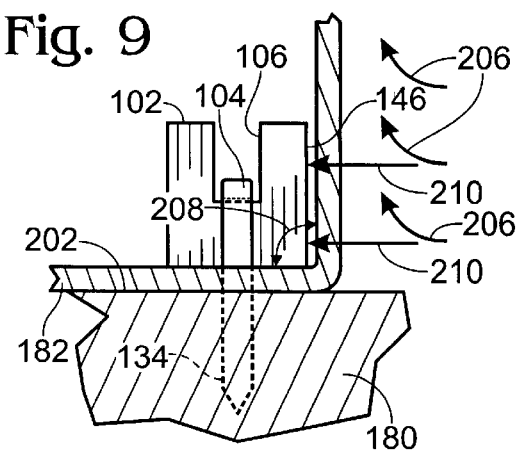
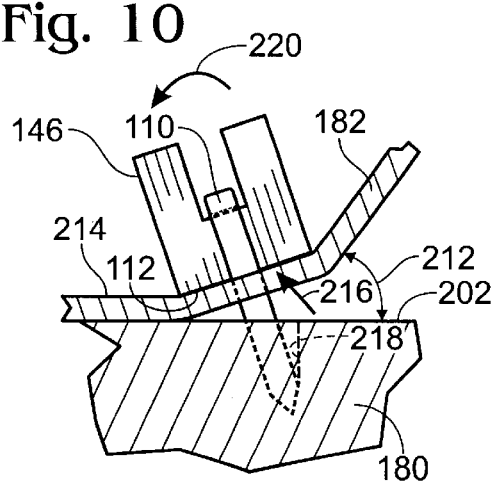
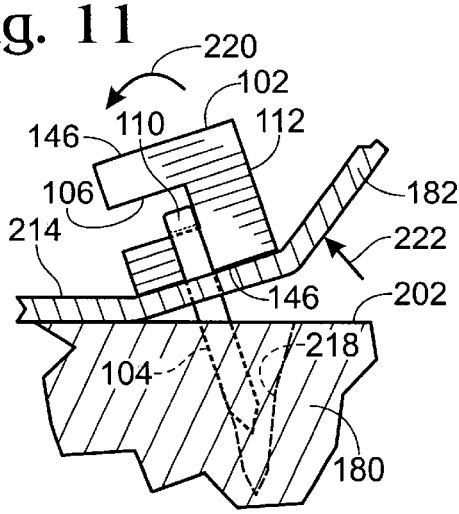
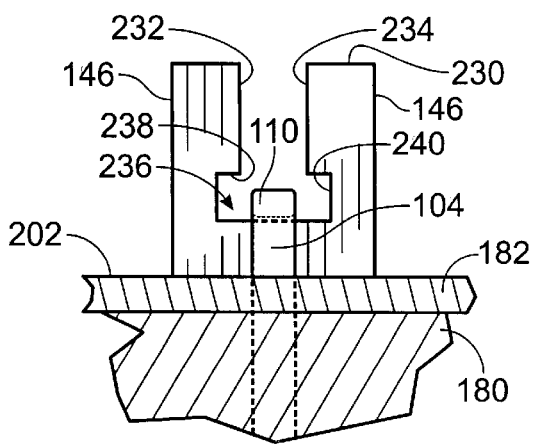
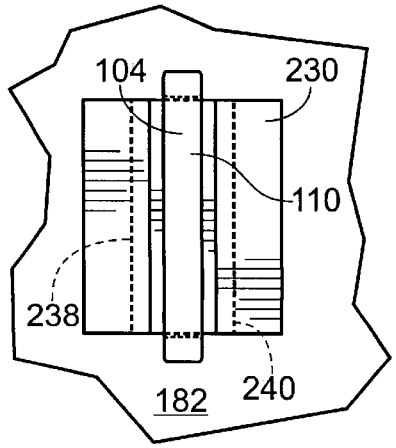

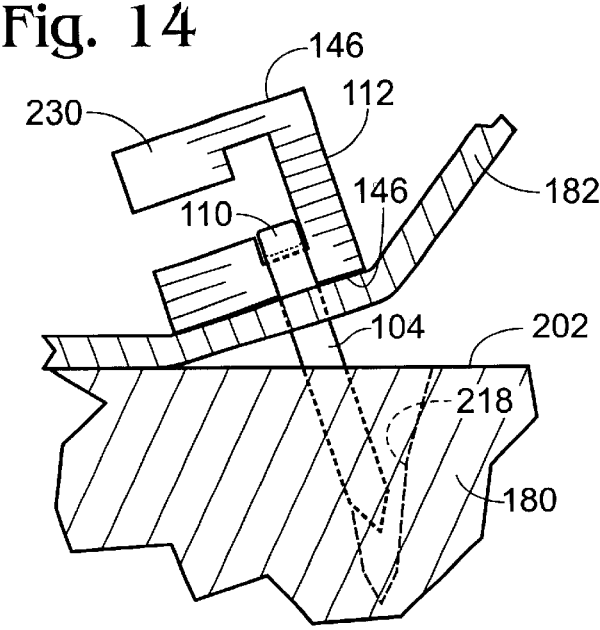
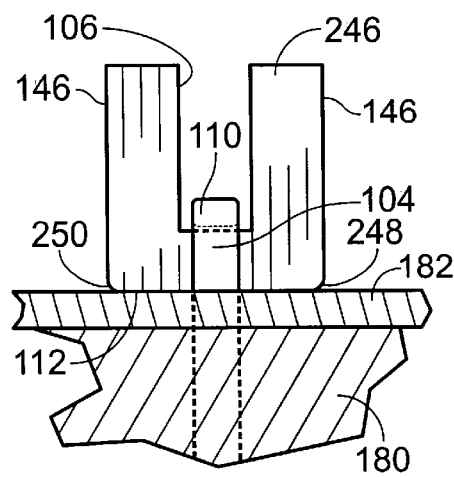
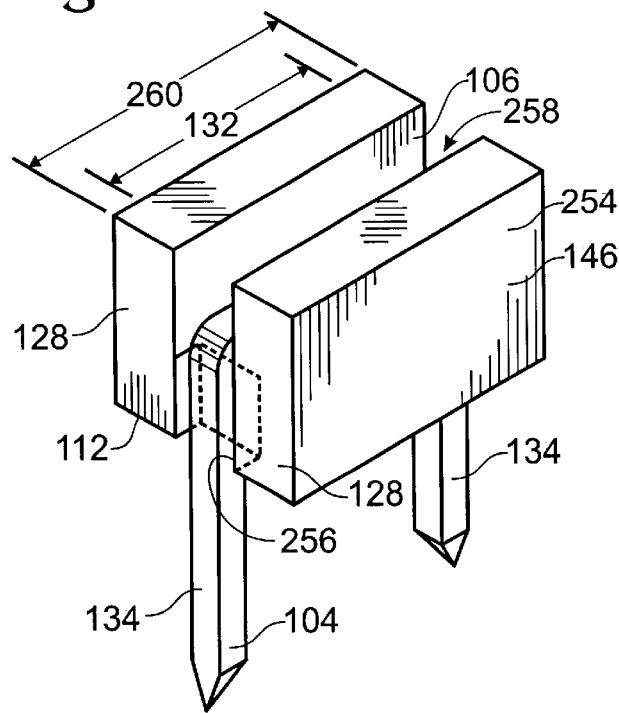
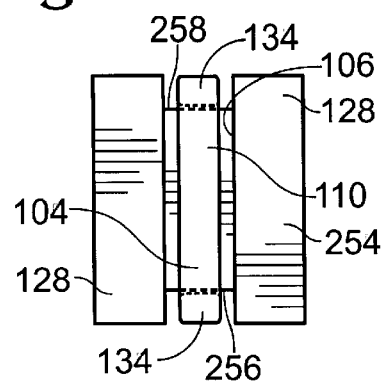

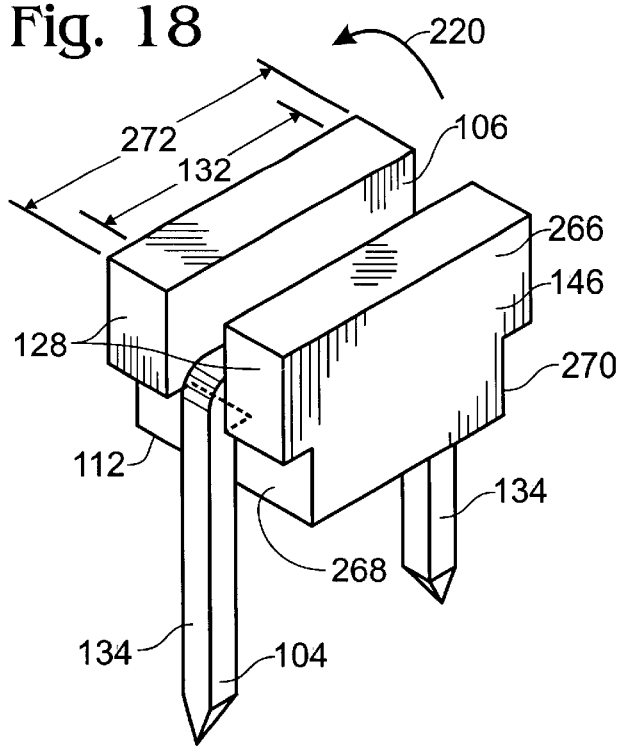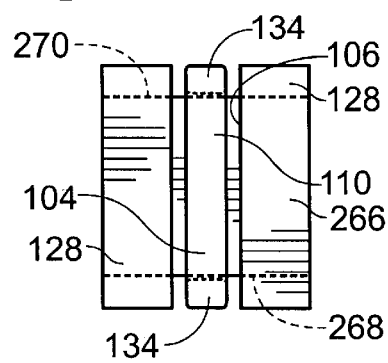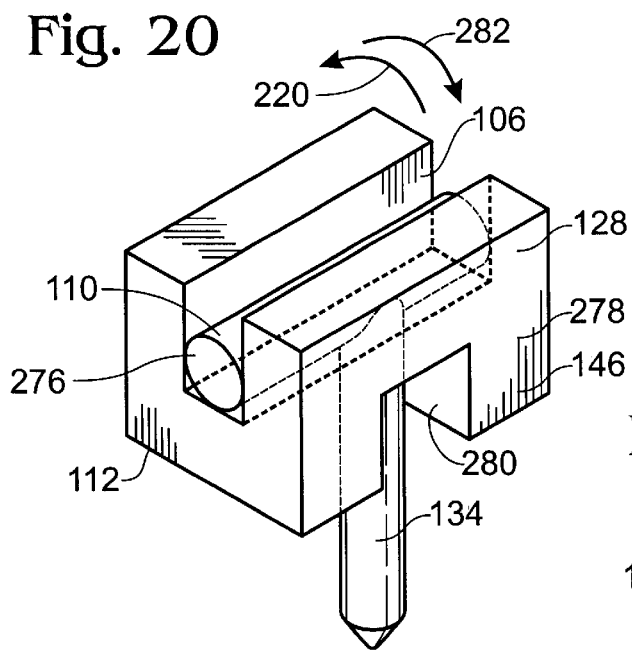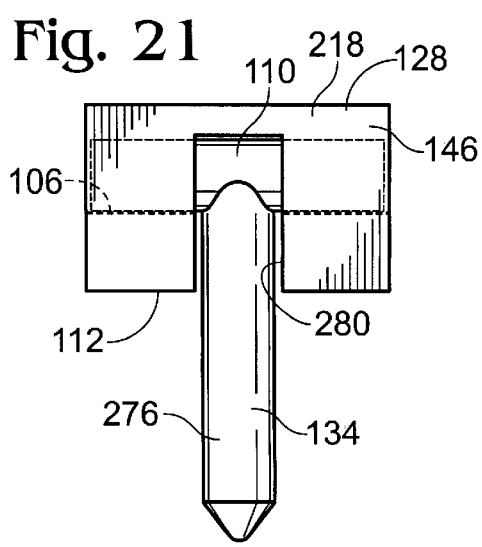

FASTENING DEVICE AND A SPACER, AND A METHOD OF USING THE SAME

TECHNICAL FIELD

The present invention relates to a fastening device for securing wrapping material to an item, and more particularly, to a removable spacer and fastener wherein the spacer increases the surface area of the fastener and thereby reduces the probability that the fastener will tear through the wrapping material such that the spacer and the fastener can be easily removed along with the wrapping material.

BACKGROUND OF THE INVENTION

Goods such as lumber units are often shipped great distances and stored in harsh environmental conditions for extended periods of time. In particular, the lumber may be left on sea docks or in open lumberyards for months at a time. During these periods the lumber is subject to harsh environmental conditions such as rain, snow and high winds, and other conditions such as pollution and bird droppings. During transit on trains or on open semi-tractor trailers, the lumber units may be subjected to flying debris such as small sticks and stones, which may hit the lumber at speeds of seventy miles an hour. Due to the high cost of lumber, and in order to minimize the damage done to the lumber during transport and storage, it is desirable to protect the lumber from exposure to these harsh environmental conditions.

Lumber units, which are shipped in a variety of sizes, typically are wrapped in a protective plastic sheeting or material, such as Nova-Thene Plus TP (Trademark owned by Intertape Polymer Group of Nova Scotia, Canada), a high strength, lightweight coated fabric consisting of a reinforcing high density polyethylene scrim coated on both sides with a film of low density polyethylene blended with other specialty resins. The protective sheeting typically is secured to the lumber unit by fasteners such as staples which are shot from a staple gun through the plastic sheeting and into the lumber. The staple typically retains the sheeting on the lumber unit during transport and storage but must be removed prior to sale or use of the lumber.

When a wrapped lumber unit is subjected to high winds, the high winds may tend to tear the plastic sheeting from the lumber unit due to the small surface area of the fastener in contact with the sheeting. In other words, as the plastic sheeting is pulled from the lumber, the fasteners tend to tear through the plastic. Moreover, during purposeful removal of the plastic sheeting from the lumber prior to use, pulling of the plastic sheeting from the lumber tends to result in the fastener tearing through the sheeting such that the fasteners remain in the lumber unit. The fasteners typically are manufactured of metal or hard plastic such that when the fasteners remain in the lumber, the fasteners may damage or destroy saw blades used to cut the lumber. In addition, fasteners left remaining in the lumber mar the appearance of the lumber and decrease the value of expensive specialty lumbers.

A variety of devices have been sold which attempt to alleviate the problem of fasteners tearing through sheeting material. For example, round, flat tabs of sheeting material or plastic having a diameter of approximately 1.5 inches have been used wherein the fastener is shot through the plastic tabs, through the sheeting material and into the lumber. These plastic tabs increase the surface area of the fasteners on the sheeting material. However, these tabs typically require two-handed operation in that the operator must hold the round tab in one hand and the staple gun in the other hand. This two-handed operation is time consuming and increases the possibility that the operator may injure his or her hands with the staple gun. If the plastic tabs are fed through a staple gun, the large size of the plastic tabs requires a large roll of the tabs to extend outwardly from the staple gun rendering the staple gun bulky and awkward to handle.

SUMMARY OF THE INVENTION

Accordingly, an object of the present invention is to provide a fastening device that increases the surface area of the fasteners so that high winds will not tear protective sheeting from a lumber unit.

Another object of the present invention is to provide a fastening device that increases the surface area of the fasteners so that when the protective sheeting is purposefully removed, the sheeting will remove the fasteners therewith.

Still a further object of the present invention is to provide a fastening device wherein the fastening device may be installed with one-handed operation.

Yet another object of the present invention is to provide a removable fastening device that is relatively inexpensive to manufacture.

Another object of the present invention is to provide a fastening device that increases the surface area of the fastener but is relatively small in size.

Accordingly, the fastening device preferably comprises a "U" shaped spacer wherein the recess of the "U" shape is captured by the upper cross bar of a standard fastener/staple as the fastener is fastened to the lumber. The spacer has a flat bottom surface and a flat side surface. The flat bottom surface is used to increase the surface area of the standard staple so as to retain the sheeting on the lumber during shipping. The flat side surface is used to increase the surface area of the standard staple during removal of the plastic sheeting so that when the plastic sheeting is pulled from the lumber, the plastic sheeting will pull the spacer and the staple from the lumber. In other words, the spacer prevents the staple from ripping through the plastic and remaining in the lumber when the plastic is removed. Removal of the staple with the plastic sheeting allows milling of the lumber without the fear of breaking a saw blade due to staples remaining in the lumber. In a preferred embodiment, the staples and the spacers are manufactured in tracks which are fed along flat, parallel elongate axes underneath the handle of a staple gun to allow one-handed fastening of the staples and the spacers to a lumber unit.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 5 is a side view of a staple gun showing installation of the fastening device on a lumber unit;

FIG. 6 is a perspective view of a lumber unit wrapped in plastic sheeting;

FIG. 7 is a top view of the fastening device securing plastic sheeting to a lumber unit;

FIG. 8 is a side view of the fastening device of FIG. 7;

FIG. 9 is a side view of the fastening device retaining the plastic sheeting in place during high winds.

FIG. 10 is side view of the fastening device being purposefully removed from the lumber unit along with the plastic sheeting wherein the fastener is just beginning to be removed;

FIG. 11 is another side view of the fastening device being purposefully removed from the lumber unit along with the plastic sheeting wherein the fastener is almost fully removed and wherein the spacer has rotated about the crossbar of the fastener;

FIG. 12 is a side view of another embodiment of the fastening device;

FIG. 13 is a top view of the device of FIG. 12;

FIG. 14 is a side view showing removal of the device of FIG. 12;

FIG. 15 is a side view of another embodiment of the fastening device;

FIG. 16 is a perspective view of another embodiment of the fastening device;

FIG. 17 is a top view of the device of FIG. 16;

FIG. 18 is a perspective view of another embodiment of the fastening device;

FIG. 19 is a top view of the device of FIG. 18;

FIG. 20 is a perspective view of another embodiment of the fastening device; and FIG. 21 is a front view of the device of FIG. 20.

DETAILED DESCRIPTION

Figure 1:
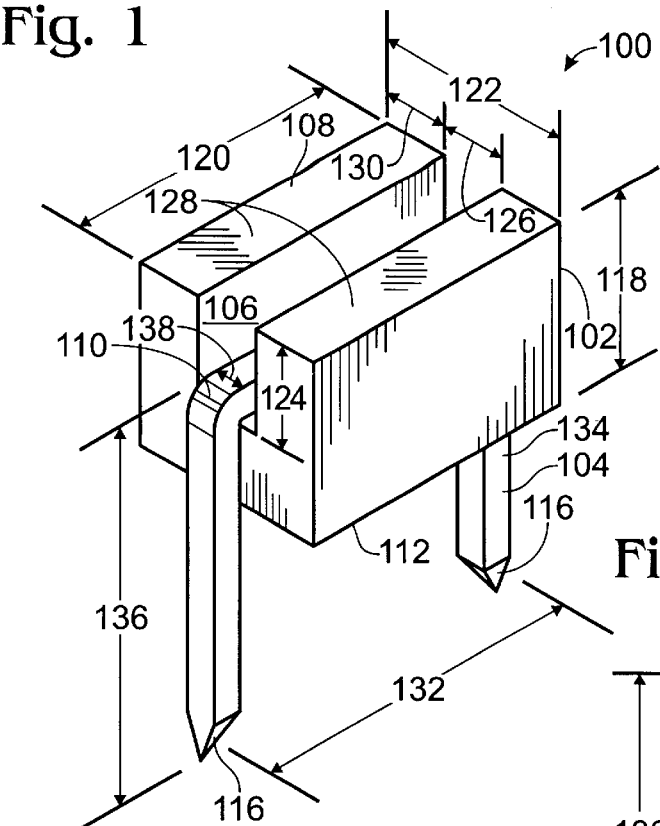
FIG. 1 is a perspective view of the fastening device comprising a spacer and a fastener.

FIG. 1 is a perspective view of the fastening device of the present invention 100 showing a spacer 102 and a staple 104. Spacer 102 includes a recess 106 extending downwardly from a top surface 108 of the spacer wherein the upper crossbar 110 of the staple is captured within the recess. In this position, a bottom surface 112 of the spacer contacts a piece of protective plastic sheeting (not shown) placed over a shipping unit, such as a stack of lumber. The lower, pointed ends 116 of staple 104 ideally extend through the fabric of the plastic sheeting and into the lumber unit to retain the sheeting and the fastening device in place.

The fastening device of the present invention may be secured to a variety of items such as stacks of lumber, also called lumber units, large pieces of furniture, the open halves of unassembled double wide mobile homes, packing crates, materials held on pallets, greenhouse frames, and the like. The fastener may be secured into any material into which the fastener will penetrate, such as plastic, lumber or other materials.

Still referring to FIG. 1, in a preferred embodiment, spacer 102 has a height 118 of approximately 3.69 millimeters, a length 120 of approximately 11.75 millimeters, and a thickness 122 of approximately 3.69 millimeters. Recess 106 has a depth 124 of approximately 2.43 millimeters and a width 126 of approximately 0.9 millimeters. Accordingly, each of upwardly extending arms 128 of the spacer has a thickness 130 of approximately 1.395 millimeters. In other embodiments, each of arms 128 of the spacer may have a thickness different from one another so that the spacer is not symmetrical. Crossbar 110 of fastener 104 has a length 132 of approximately 1.2 millimeters and downwardly extending legs 134 of the staple each have a length 136 of approximately 1.2 millimeters. The width 138 of crossbar 110 is just less than 0.9 millimeters. Accordingly, the fastener cross bar is frictionally received within recess 106. The legs 134 of the fastener extend downwardly on either side of the spacer such that the spacer is captured between legs 134 of the staple and such that the legs extend downwardly from the spacer a distance sufficient to be received in an item of lumber or the like to secure plastic sheeting thereto.

Lower surface 112 of the spacer is referred to as having a substantially flat surface in that at least approximately 50% of the footprint of the spacer is in contact with the protective sheeting. In this particular embodiment, 100% of the footprint of the spacer is in contact with the protective sheeting. The "footprint of the spacer" is defined as length 120 of the spacer, measured at its longest point, multiplied by width 122, measured at its widest point. This footprint is divided into the surface area which contacts the protective sheeting, to define the percentage of the footprint which contacts the protective sheeting. A spacer having a "substantially flat" lower surface is defined as having a footprint contact percentage greater than 50%. For example, in the case where the footprint is equal to the surface area of lower surface 112 that contacts the protective covering, then the spacer is referred to as having a 100% contact footprint. In the case where only 33% of the footprint of the spacer contacts the protective sheeting, the spacer is not defined as having a substantially flat lower surface because 67% of the lower surface is not in contact with the protective covering. This same terminology is used to describe a "substantially flat" side surface of the spacer wherein the side surface has a contact percentage of 50% or greater of the "sideprint" of the spacer (wherein the sideprint is determined by multiplying the longest length of the spacer by the longest height of the spacer).

Figure 2:
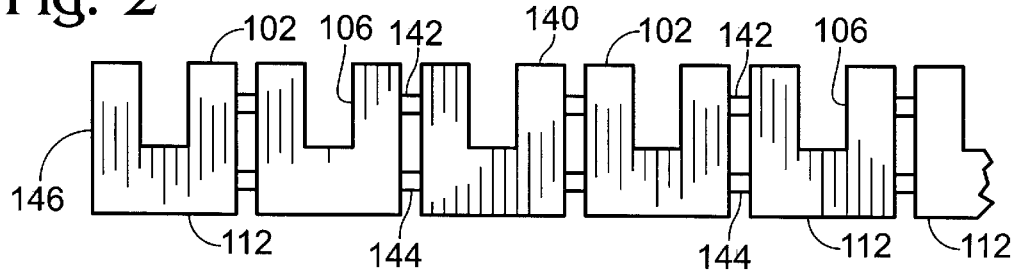
FIG. 2 is a side view of a continuous track of spacers.

FIG. 2 is a side view of a continuous track 140 of the spacers 102 showing recesses 106 and bottom surfaces 112. The spacers are typically manufactured of plastic but any appropriate material may be used. Nubbins 142 and 144 are positioned between each of individual spacers 102 and secure the spacers together. In the preferred embodiment, two upper nubbins 142 and two lower nubbins 144 are positioned between adjacent spacers. Spacers 102 are molded in the form of continuous tracks 140 wherein each track has a length sized appropriately to be received within the magazine of a staple gun. For example, a track length of six inches or more may be appropriate. Accordingly, multiple spacers are easily loaded into a staple gun so that the multiple spacers are each correctly aligned within the staple gun. Due to the relatively narrow width of the spacers, a relatively large number of spacers may be manufactured in a single track. Even though the width of the spacers is relatively small compared to the width of the flat round tabs of the prior art, the surface area of the spacers of the present invention is surprisingly effective at reducing tearing of the protective sheeting and in increasing the number of fasteners that are removed with the sheeting, compared to staples used without spacers.

When an individual spacer is secured to a lumber unit, as will be described below, the nubbins are easily severed or broken by the impact of the driver of the staple gun thereby allowing the endmost spacer to be removed from the remainder of track 140. Nubbins 142 and 144 may have different shapes and thickness in different embodiments, so long as the nubbins function to secure adjacent spacers to one another. In addition, any number of nubbins may be used to secure adjacent spacers together, such as one nubbin or a plurality of nubbins between each spacer. Upper and lower nubbins are shown as one example illustration. In FIG. 1, the nubbins are shown having a relatively large size for ease of illustration. However, the nubbins are generally small in size so that side surfaces 146 of each of the spacers will be substantially flat once the nubbins have been severed.

Figure 3:
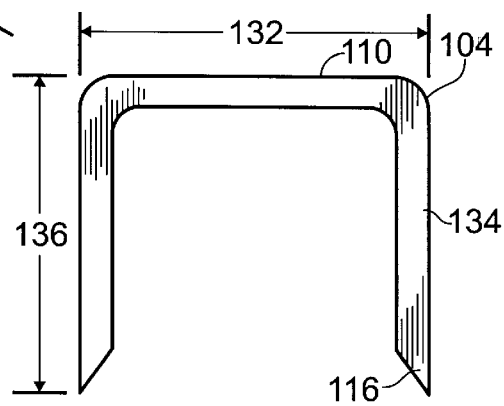
FIG. 3 is a front view of a typical fastener.

FIG. 3 is a front view of a staple 104 showing cross bar 110. The staple typically is sized so that the length 132 of the crossbar is typically just larger than the length of recess 106 (shown in FIG. 1). In this manner, the spacer is frictionally held on the crossbar of the staple but is allowed to rotate around the crossbar, as will be described below.

Figure 4:
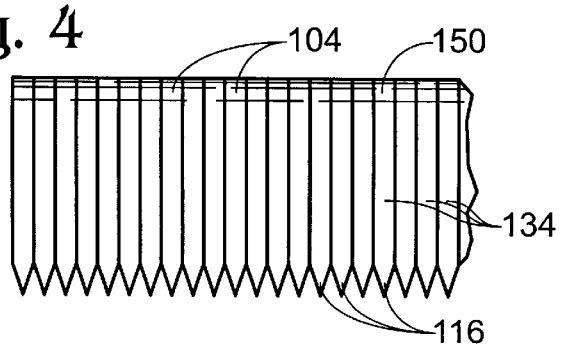
FIG. 4 is a side view of a continuous track of fasteners.

FIG. 4 is a side view of a track 150 of standard staples that may be received in a magazine of a staple gun. The individual staples 104 within the track typically are held to one another with a small amount of adhesive or the like. The track has a length sized appropriately to be received within the magazine of a staple gun, for example six inches or more. Accordingly, multiple fasteners are easily loaded into a staple gun so that the endmost fastener is correctly aligned with the endmost spacer at the impact point within the staple gun. When an individual staple is secured to a lumber unit, as will be described below, the adhesive is easily severed or broken by the impact of the driver of the staple gun thereby allowing the endmost fastener to be removed from the remainder of track 150.

FIG. 5 is a side view of a staple gun used to secure the fastening device of the present invention and a protective material, such as plastic sheeting, to a lumber unit. The gun 152 includes a handle 154, a piston 156 driven by an air compressor (not shown) via an airline 158, and a trigger 160 for actuating piston 156. Actuation of the piston moves a blunt driver 162 downwardly wherein the driver is aligned with the endmost staple 164 of standard staple track 150, and wherein the driver is also aligned with the endmost spacer 166 of spacer track 140, positioned below the endmost staple. Staples 104 and spacers 102 are each held on a magazine 168 and 170, respectively, wherein each magazine includes a spring 172 and 174, respectively, that forces the staples and the spacers toward driver 162 of the piston. In this manner, a relatively large amount of staples and spacers can be provided on an underside 176 of the staple gun without rendering the gun awkward or bulky in use. Additionally, due to positioning of the spacers within magazine 170, the spacers need not be individually handheld, thereby significantly decreasing the installation time of plastic sheeting to a lumber unit and decreasing the possibility that an operator may injure his or her hands. The spacers typically would be hidden from view within magazine 170. Accordingly, magazine 170 is shown partially cutaway for ease of illustration.

FIG. 6 is a perspective view of a lumber unit 180 wrapped in plastic sheeting 182. Lumber unit 180 typically comprises multiple individual lumber boards 184 stacked in a compact arrangement for transport. The lumber unit may have, for example, a height 186 of four feet, a width 188 of six feet, and a length 190 of twelve feet or more. Of course, the item of material being protected by sheeting 182 may have any dimensions as is desired. The lumber unit typically is held together with strapping tape (not shown). The fastening devices used to secure the plastic sheeting to the lumber typically have a length less than one centimeter. Accordingly, fastening devices 100 shown securing sheeting 182 to lumber unit 180 are greatly exaggerated in size so as to illustrate the principle of the present invention. As stated earlier, the fastening devices may be used to secure protective material to a variety of items having a variety of sizes. Accordingly, the size of the fastening devices, or the items being protected, may be of any size and dimension.

Still referring to FIG. 6, a region 192 of plastic sheeting is shown cutaway in order to view individual boards 184. The boards typically are supported on a pallet or on support beams 194. Individual fastening devices 100 are shown generally equally spaced around lumber unit 180 to secure plastic sheeting 182 tightly around the lumber unit. The sheeting covers and protects the lumber unit against harsh environmental elements. The plastic wrapping may be neatly folded on an end 196 of the lumber unit wherein the fastening devices are secured through the multiple layers of plastic material and into the lumber unit. Fastening devices 100 are shown in a preferred orientation wherein an elongate axis 198 of recess 106 of the spacer and of crossbar 110 of the staple extends generally vertically. When the fastening devices are all secured in this general vertical arrangement, the fastening devices are easily pulled from the lumber unit together with the plastic sheeting, as will be explained in more detail below. Moreover, when the fastening devices are all secured in this general vertical arrangement, the installation time is minimal because the staple gun is not twisted into different orientations between the stapling of each staple. However, other arrangements of the fastening devices may also be utilized, such as diagonal placement, horizontal placement, or mixed diagonal, vertical and horizontal placement of the fastening devices on the lumber unit. In these cases, the sheeting material will be pulled in a direction perpendicular to the elongate axis of each of the spacers to remove the sheeting, as will be described below.

FIG. 7 shows a top view of a single fastening device 100 including a staple 104 and a spacer 102 fastened to a lumber unit 180 wherein the sharp legs of the fastener have penetrated the fabric sheeting 182 and extend downwardly within the lumber unit. The hardness of the staple used typically will depend on the type of wood being wrapped. For example, when wrapping hardwoods such as oak, relatively hard staples are used, whereas when wrapping relatively softwood such as pine, softer, less durable fasteners may be used. Moreover, the hardness of the staple used may also depend on the area of the wood in which the staple is fastened. For example, when the staple is secured within the end grain of a board, the staple used may be less hard than when the staple is secured against the grain of the board. The fastener typically used will have a hardness and strength so that the staple can be secured within a variety of materials in a variety of areas of the materials. The staple is shown having a length 132 slightly greater than a length 120 of spacer 104 such that the crossbar 110 of the staple is received within recess 106 of the spacer.

FIG. 8 shows a side view of the staple and spacer of FIG. 7 wherein staple 104 is secured in lumber unit 180 to secure the protective fabric 182 to the lumber. In this manner the lumber unit is protected from the elements during shipping and handling. Lower surface 112 of the spacer effectively increases the surface area of the crossbar of the staple which contacts the fabric sheeting so that the fabric will not as easily be torn from the lumber unit during shipping, compared to the case when just the staple is used by itself without a spacer. For example, using the dimensions recited with respect to FIG. 1, lower surface 112 of the spacer has a surface area of approximately 43.36 square millimeters. The lower surface 200 of the crossbar of the staple has a surface area (this is the surface that would contact the plastic sheeting if no spacer were used with the staple) of approximately 9.44 millimeters. The larger surface area of the spacer will tend to reduce tearing of the plastic sheeting compared to when a staple is used by itself. In addition, due to the larger surface area of the spacer compared to the surface area of the crossbar of the staple, the spacer will tend to facilitate purposeful removal of the spacers and the fasteners together with the protective sheeting when the sheeting is removed from the lumber unit. Using the spacer of the present invention, over 90% of the fasteners are removed from the lumber unit with the sheeting, thereby reducing the risk that fasteners are left remaining in the lumber when the protective sheeting is removed.

Still referring to FIG. 8, legs 134 of the staple are shown having pierced protective sheeting 182 and the lumber unit. The legs of the staple are driven into the lumber unit with enough force such that lower surface 112 of the spacer contacts the plastic sheeting and forces the sheeting downwardly and against an outer surface 202 of the lumber unit. Accordingly, the sheeting is tightly bound to the lumber unit. The crossbar 110 of the staple is shown completely received within recess 106 such that the crossbar does not extend upwardly or outwardly from the recess. The staple is driven with enough force so that the crossbar of the staple contacts the bottom surface 204 of recess 106 and wherein the bottom surface of the recess of the spacer acts as a stop to prevent further penetration of the staple into the lumber unit.

FIG. 9 shows the fabric being pulled by a force 206 of high winds. In this scenario, the high winds may blow an edge of plastic sheeting 182 away from the lumber. This creates an approximate ninety degree angle 208 of the sheeting at spacer 102 and a force on the spacer in a direction 210, approximately perpendicular to side surface 146 of the spacer. This force on the spacer perpendicular to side surface 146 is also perpendicular to elongate legs 134 of the staple which are secured within the lumber unit. Accordingly, this perpendicular force on the spacer typically will not result in the fastening device being pulled from the lumber unit. In addition, due to the large surface area of the spacer in contact with the plastic sheeting, the perpendicular force on the spacer typically will not result in the spacer tearing through the plastic sheeting. Accordingly, the spacer of the present invention acts to reduce the chances of the plastic sheeting being torn from the lumber unit during periods of high winds.

FIG. 10 shows protective fabric 182 being initially purposefully pulled from lumber unit 180. The fabric sheeting preferably is initially pulled upwardly at an angle 212 of approximately forty-five degrees with respect to top surface 202 of the lumber unit. This angle of pulling of the plastic sheeting results in top surface 214 of the sheeting pulling on bottom surface 112 of the spacer with a force 216. Due to the positioning of crossbar 110 within recess 106, this angle of pulling also results in the force 216 being applied to the elongate legs of the staple, at an angle of approximately forty-five degrees with respect to top surface 202 of the lumber unit. It is believed that this angle of force maximizes the upwardly force on the entirety of bottom surface 112 of the spacer and the staple such that the spacer pulls the staple upwardly together with the plastic sheeting. This force tends to move elongate legs 134 of the staple within the lumber unit such that the original aperture 218, which was created in the lumber when the staple was initially secured therein, is only slightly enlarged near the surface of the lumber unit. This slight enlargement of aperture 218 allows the staple to be pulled from the lumber unit without substantially marring the appearance of the lumber. Moreover, an even force on the underside 112 of the spacer is maintained because the spacer rotates about crossbar 110 of the staple in a direction 220. This rotation of the spacer ensures that the full surface area 112 of the lower surface of the spacer is always in contact with the plastic sheeting during purposeful pulling of the sheeting, thereby reducing the chances that the spacer or the staple will tear through the plastic sheeting.

FIG. 11 shows the staple almost completely removed from the lumber unit and spacer 102 rotated approximately ninety degrees in direction 220 about crossbar 110 of staple 104. As protective sheeting is further pulled in a direction 222 (which may be greater than a forty five degree angle from surface 202 in this latter stage of removal of the fastening device) from the position shown in FIG. 10, the spacer rotates about crossbar 110 which allows movement of the plastic sheeting with respect to the staple without the sheeting frictionally pulling across or rubbing directly against the staple or the spacer. (The sheeting may also be pulled from the other direction so that that the spacer will rotate about crossbar 10 in a direction opposite to direction 220.) Accordingly, a flat surface of the spacer (either bottom surface 112 or side surface 146) is in contact with the protective sheeting throughout the entire pulling cycle of the sheet from the lumber unit. This distributes the pulling force across a relatively large area of the spacer and reduces the chance that the sheeting will become torn. Additionally, this frictionless movement of the protective sheeting with respect to the spacer, i.e., the sheeting "rolls" with the rotating spacer instead of pulling across the surface of the spacer or the fastener, reduces the chance that the sheeting will become torn. In this manner, fastener 104 is removed from aperture 218 in lumber unit 180 along with the spacer and the sheeting material. Accordingly, the sheeting is removed without leaving any staples in the lumber, thereby reducing the chance that damage may occur to the wood or to saw blades used to cut the wood.

FIG. 12 is another embodiment 230 of the spacer secured to a lumber unit. In this embodiment, spacer 230 includes a recess 232 having an elongate channel 234 which terminates in a keyed area 236. Keyed area 236 includes recesses 238 and 240 which extend outwardly from elongate channel 234. These recesses facilitate capture of crossbar 110 of fastener 104 as the spacer is rotated about the crossbar during removal of sheeting 182 from lumber unit 180. In this embodiment, the spacer has a substantially flat lower surface in that 100% of the footprint of the spacer contacts the protective sheeting.

FIG. 13 shows a top view of spacer 230 secured to a lumber unit.

FIG. 14 shows a side view of the spacer 230 just prior to removal of the fastening device from the lumber unit wherein crossbar 110 is captured within the keyed area of the recess.

FIG. 15 shows another embodiment 246 of the spacer having rounded corners 248 and 250 between bottom surface 112 and side surfaces 146 of the spacer. The rounded corners facilitate rotation of the spacer about the crossbar of the fastener. Bottom surface 112 and side surfaces 146 are still substantially flat, however, which facilitates a relatively large contact area between the spacer and protective sheeting 182 during removal from the lumber unit 180.

FIG. 16 shows another embodiment 254 wherein recess 106 includes cutout regions 256 and 258 (region 258 is not shown in this view but is a mirror image of region 256) for receiving legs 134 of fastener 104. A length 260 of spacer 254 typically is longer than length 132 of crossbar 110 so that legs 134 of the fastener are aligned between arms 128 of the spacer. In this embodiment, arms 128 of the spacer facilitate alignment of each staple with its corresponding spacer during stapling of the fastening device to the lumber unit through use of the staple gun. The large surface area of lower surface 112 of the spacer facilitates removal of the spacer and the fastener during removal of protective sheeting. Arms 128 of the spacer which enclose legs 134 of the fastener, however, prohibit rotation of the spacer about crossbar 110 of the staple during removal of protective sheeting 182. In this embodiment, lower surface 112 of the spacer still has a substantially flat surface in that at least approximately 75% of the footprint of the spacer is in contact with the protective sheeting.

FIG. 17 shows a top view of fastening device 254 of FIG. 16.

FIG. 18 shows another embodiment 266 wherein recess 106 includes cutout regions 268 and 270 for receiving legs 134 of fastener 104 and for allowing the spacer to rotate about crossbar 110 of the fastener. A length 272 of spacer 266 typically is longer than length 132 of crossbar 110 so that legs 134 of the fastener are aligned between arms 128 of the spacer during initial movement of the fastener through the spacer while being secured to the lumber unit by the staple gun. Accordingly, side walls 128 of the spacer help to align the fastener and the spacer during attachment to a lumber unit. However, recesses 268 and 270 allow the spacer to rotate about fastener 104 in direction 220, or in a direction opposite to direction 220, during removal of the protective sheeting. In this embodiment, lower surface 112 of the spacer has a substantially flat surface in that at least approximately 60% of the footprint of the spacer is in contact with the protective sheeting. The large surface area of lower surface 112 and side surface 146 of the spacer facilitates removal of the spacer and the fastener during removal of protective sheeting. This embodiment has the dual benefit of facilitating alignment of the spacer with the fastener during fastening, and allowing the spacer to rotate about the crossbar of the fastener during removal of the fastening device. However, due to the relatively high manufacturing costs of this embodiment, the embodiment shown in FIG. 1 is the preferred embodiment.

FIG. 19 shows a top view of fastening device 266 of FIG. 18.

FIG. 20 shows a pin type fastener 276 held within a spacer 278 having a cutout region 280 which connects with recess 106 which in turn facilitates rotation of the spacer about upper crossbar 110 of fastener 276 in either of directions 220 or 282. The connection between cutout region 280 and recess 106 may be described and two rectangular channels which intersect with each other at right angles. In this embodiment, fastener 276 includes only one downwardly extending leg 134, which extends downwardly from a central region of crossbar 110. In this embodiment, lower surface 112 of the spacer has a substantially flat surface in that at least approximately 75% of the footprint of the spacer is in contact with the protective sheeting. This embodiment has the dual benefit of facilitating alignment of the spacer with the fastener during fastening, and allowing the spacer to rotate about the crossbar of the fastener during removal of the fastening device. However, due to the relatively high manufacturing costs of this embodiment, the embodiment shown in FIG. 1 is the preferred embodiment.

FIG. 21 is a side view of the fastener and spacer of FIG. 20.

With reference to the figures, the method of the present invention will now be described. The method of securing a protective sheeting to an object, comprises the steps of: providing an object; providing a protective sheeting; providing a fastener having a crossbar and at least one leg extending perpendicularly outwardly from said crossbar; providing a spacer having a substantially flat lower surface and a top surface with a recess extending downwardly therefrom; aligning the fastener and the spacer such that the crossbar of the fastener is aligned with the recess of the spacer; and forcing the leg of the fastener through the protective sheeting and into the object such that the crossbar is received within the recess, the fastener forces the spacer and the protective sheeting against the object, and the spacer and the protective sheeting are captured between the object and the crossbar. The method further comprises the step of pulling the protective sheeting from the object to remove the spacer and the fastener from the object wherein during pulling of said protective sheeting the sheeting initially contacts the spacer along its substantially flat lower surface. As the protective sheeting is pulled, the spacer typically rotates about the crossbar such that the protective sheeting is removed from the object in the absence of a frictional force between the spacer and the protective sheeting. The fastener may be provided in a track, the spacer may be provided in a track, and the step of forcing the leg of the fastener through the protective sheeting and into the object may be accomplished with a staple gun. The spacers may include an elongate axis wherein the spacers are typically secured to the object with the elongate axis extending vertically with respect to the object so that the sheeting can be pulled in a single direction to remove the sheeting and the staples without tearing the sheeting. During pulling of the protective sheeting from the object, the protective sheeting initially contacts the spacer along its substantially flat lower surface and thereafter the spacer rotates about the crossbar of the fastener such that a substantially flat side surface of the spacer contacts the protective sheeting. In this manner, the flat lower surface or the flat side surface of the spacer is in contact with the sheeting thereby reducing the chances that the sheeting may become torn.

While preferred embodiments of the present invention have been shown and described, it will be apparent to those skilled in the art that many changes and modifications may be made without departing from the invention in its broader aspects. The appended claim are intended to cover, therefore, all such changes and modifications as fall within the true spirit and scope of the invention.

I claim:

1. A fastening device comprising:
   a fastener having a crossbar and at least one leg extending perpendicularly outwardly from said crossbar; and
   a spacer having a substantially flat lower surface, a top surface with a recess extending downwardly therefrom, wherein said recess captures therein said crossbar of said fastener when said fastener and said spacer are secured together such that said leg extends downwardly past said lower surface and away from said top surface wherein said spacer is manufactured in the form of an elongate track including a plurality of spacers.

2. A fastening device comprising:
   a fastener having a crossbar and at least one leg extending perpendicularly outwardly from said crossbar; and
   a spacer having a substantially flat lower surface, a top surface with a recess extending downwardly therefrom, wherein said recess captures therein said crossbar of said fastener when said fastener and said spacer are secured together such that said leg extends downwardly past said lower surface and away from said top surface wherein said recess includes a keyed area.

3. A fastening device comprising:

a fastener having a crossbar and at least one leg extending perpendicularly outwardly from said crossbar; and a spacer having a substantially flat lower surface, a top surface with a recess extending downwardly therefrom, wherein said recess captures therein said crossbar of said fastener when said fastener and said spacer are secured together such that said leg extends downwardly past said lower surface and away from said top surface wherein said spacer has a length, wherein said crossbar of said fastener has a length, and wherein said length of said spacer is greater than said length of said crossbar, and wherein said lower surface includes a cutout region which allows said spacer to rotate about said crossbar while retaining said crossbar in said recess.

4. A method of securing a protective sheeting to an object, comprising the steps of:

providing an object;

providing a protective sheeting;

providing a fastener having a crossbar and at least one leg extending perpendicularly outwardly from said crossbar;

providing a spacer having a substantially flat lower surface and a top surface with a recess extending downwardly therefrom;

aligning said fastener and said spacer such that said crossbar of the fastener is aligned with said recess of the spacer; and forcing said leg of said fastener through said protective sheeting and into said object such that said crossbar is received within said recess, said fastener forces said spacer and said protective sheeting against said object, and said spacer and said protective sheeting are captured between said object and said crossbar wherein said substantially flat lower surface of the spacer contacts said protective sheeting.

5. The method of claim 4 further comprising the step of pulling said protective sheeting from said object to remove said spacer and said fastener from said object wherein during pulling of said protective sheeting said protective sheeting initially contacts said spacer along said substantially flat lower surface.

6. The method of claim 5 wherein as said protective sheeting is pulled, said spacer rotates about said crossbar such that said protective sheeting is removed from said object in the absence of a frictional force between said spacer and said protective sheeting.

7. The method of claim 4 wherein said fastener is provided in a track, said spacer is provided in a track, and wherein said step of forcing said leg of said fastener through said protective sheeting and into said object is accomplished with a staple gun.

8. The method of claim 4 wherein said spacers include an elongate axis and wherein said spacers are secured to said object with said elongate axis extending vertically with respect to said object.

9. The method of claim 5 wherein during pulling of said protective sheeting from said object, said protective sheeting initially contacts said spacer along its substantially flat lower surface and thereafter said spacer rotates about said crossbar of the fastener such that a substantially flat side surface of said spacer contacts said protective sheeting.

10. A spacer apparatus comprising:

a track of spacers, wherein each spacer comprises a substantially flat lower surface, a substantially flat side surface, and a top surface having a recess extending downwardly therefrom, said recess being sized to receive therein the crossbar of a fastener, and wherein said track includes nubbins which join together each of the individual spacers.

11. The apparatus of claim 10 further comprising a fastener including a crossbar and two legs extending perpendicularly outwardly from said crossbar, said crossbar sized to be received within said recess, and wherein said spacer includes a rounded corner between said lower surface and said side surface.

12. The apparatus of claim 10 further comprising a track of fasteners, each fastener of said track including a crossbar and at least one leg extending perpendicularly outwardly from said crossbar, and wherein each of said crossbars are sized to be received within a corresponding recess of said track of spacers.

13. The apparatus of claim 10 wherein said substantially flat lower surface of each spacer comprises at least 75% of a footprint of said spacer.

14. The apparatus of claim 10 further comprising a track of fasteners, each fastener of said track including a crossbar, wherein each spacer has a length, wherein said crossbar of each fastener has a length, and wherein said length of said spacer is less than said length of said crossbar such that said spacer can rotate about said crossbar of the spacer when said spacer and fastener are being removed from an object.

15. The apparatus of claim 10 wherein said recess includes a keyed area.

* * * * *